US006992464B2

(12) United States Patent
Takano et al.

(10) Patent No.: US 6,992,464 B2
(45) Date of Patent: Jan. 31, 2006

(54) BATTERY CHARGER CAPABLE OF INDICATING TIME REMAINING TO ACHIEVE FULL CHARGE

(75) Inventors: Nobuhiro Takano, Hitachinaka (JP);
Takao Aradachi, Hitachinaka (JP);
Toshio Mizoguchi, Hitachinaka (JP);
Eiji Nakayama, Hitachinaka (JP);
Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 123 days.

(21) Appl. No.: 10/715,135

(22) Filed: Nov. 18, 2003

(65) Prior Publication Data

US 2004/0135548 A1 Jul. 15, 2004

(30) Foreign Application Priority Data

Nov. 18, 2002 (JP) .............................. 2002-334269
Nov. 18, 2002 (JP) .............................. 2002-334291

(51) Int. Cl.
*H02J 7/00* (2006.01)
(52) U.S. Cl. ...................................... 320/150; 320/155
(58) Field of Classification Search ................ 320/150, 320/148, 155
See application file for complete search history.

(56) References Cited

U.S. PATENT DOCUMENTS

| 4,755,735 | A | * | 7/1988 | Inakagata | .................... 320/150 |
| 5,621,302 | A | * | 4/1997 | Shinohara | .................... 320/148 |
| 5,627,452 | A | * | 5/1997 | Okada | ........................ 320/148 |
| 6,100,668 | A | * | 8/2000 | Takano | ....................... 320/148 |

FOREIGN PATENT DOCUMENTS

JP 05-290895 11/1993

* cited by examiner

*Primary Examiner*—Pia Tibbits
(74) *Attorney, Agent, or Firm*—McGuireWoods LLP

(57) ABSTRACT

A battery charger includes a battery voltage detector for detecting the voltage of a secondary battery and a battery temperature sensor for detecting the temperature of the secondary battery. A controller determines the voltage of the secondary battery prior to beginning the charging process based on output from the battery voltage detector. The controller also determines the charging level from among a plurality of levels that indicate how much time is required for the secondary battery to reach a full charge, based on the determined voltage of the secondary battery and output from the battery temperature sensor. A display is provided for displaying the charging level that indicates the time remaining to achieve a full charge.

14 Claims, 6 Drawing Sheets

FIG.4

| | |
|---|---|
| LARGE REMAINING BATTERY CAPACITY FLAG | "1" WHEN CELL VOLTAGE $\geq$ 1.4V |
| MEDIUM REMAINING BATTERY CAPACITY FLAG | "1" WHEN 1.4V > CELL VOLTAGE > 1.25V |
| SMALL REMAINING BATTERY CAPACITY FLAG | "1" WHEN CELL VOLTAGE $\leq$ 1.25V |
| HIGH BATTERY TEMPERATURE FLAG | "1" WHEN PRECHARGE BATTERY TEMPERATURE T0 $\geq$ 40°C |
| LED 92 ED LIGHT FLAG | "1" WHEN BATTERY CAPACITY IS SMALL |
| $\Delta$V FLAG | "1" WHEN $\Delta$V - $\Delta$Vmin $\geq$ R1 |

FIG.5

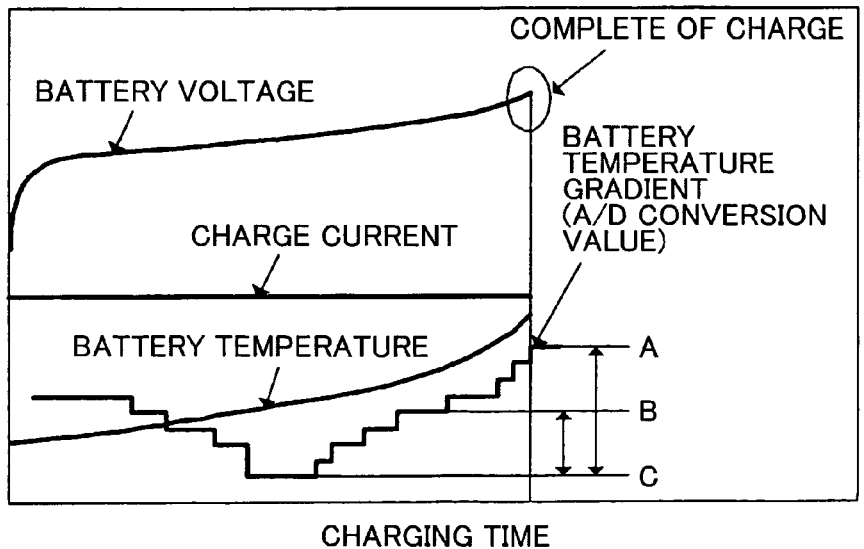

BATTERY CHARGER CAPABLE OF INDICATING TIME REMAINING TO ACHIEVE FULL CHARGE

BACKGROUND OF THE INVENTION

1. Field of the Invention

The present invention relates to a battery charger for charging secondary batteries, such as nickel-cadmium batteries and nickel-hydrogen batteries.

2. Description of the Related Art

Chargeable batteries are normally used for powering portable devices. In an operation that can be repeated multiple times, the chargeable batteries are removed from the portable device, charged with a battery charger, and subsequently reloaded into the portable device. Users of these portable devices have expressed a desire to know the amount of charge a battery has at the beginning of use, since a sudden loss of battery power during use degrades operating efficiency. These users have also indicated a desire to know, when charging the batteries, how much time will be required to complete the charging operation.

In order to meet these demands, batteries with charge amount displays have been proposed in recent years, such as that disclosed in Japanese Patent Application Publication No. 2001-116812. In this proposal, a microcomputer is built into the body of the battery for accumulating load current and operating time. The charge amount of the battery (remaining capacity) is displayed on an LED or the like by comparing the accumulated quantities to the rated capacity of the battery. Further, a battery charger such as that disclosed in Japanese Patent Application Publication No. 10-174308 proposes displaying the charge amount of the battery (remaining capacity) with a plurality of LEDs provided in the battery charger.

However, in the former example of the battery with charge amount display, it is necessary to equip the battery itself with a microcomputer or other means to accumulate the load current and operating time. Moreover, the user demands mentioned above cannot be met with batteries not equipped with such microcomputers. In the latter example of the battery charger, while it is possible to display the charge amount (remaining capacity) of a battery, the battery charger must be equipped with a plurality of LEDs, which is disadvantageous both spatially and economically.

SUMMARY OF THE INVENTION

In view of the foregoing, it is an object of the present invention to provide a battery charger with a function for displaying how much time is required to completely charge a battery at the beginning of and during the charging operation.

It is another object of the present invention to provide a battery charger capable of displaying the time required to complete a charging operation that is economical and minimizes space required for the LEDs by providing the battery charger with a single LED.

To achieve the above and other objects, there is provided, according to one aspect of the invention, a battery charger for charging a secondary battery, that includes a battery voltage detector that detects a voltage of the secondary battery and outputs a voltage signal indicative of the voltage of the secondary battery; a battery temperature sensor that detects a temperature of the secondary battery and outputs a temperature signal indicative of the temperature of the secondary battery; a controller that determines an estimated time level from among a plurality of different estimated time levels that indicate how much time is required for the secondary battery to reach a full charge based on the temperature signal and the voltage signal both output when the secondary battery is at a precharge state; and a display that indicates information regarding the estimated time level based on determination made by the controller.

According to another aspect of the invention, there is provided a battery charger for charging a secondary battery, that includes a battery temperature sensor that detects a temperature of the secondary battery and outputs a temperature signal indicative of the temperature of the secondary battery; a controller that calculates a temperature gradient within a predetermined time interval based on the temperature signal, determines whether the secondary battery is on the verge of a full charge or the secondary battery has reached a full charge based on the temperature gradient, and further determines an estimated time level from among a plurality of different estimated time levels that indicate how much time is required for the secondary battery to reach a full charge based on whether the secondary battery is on the verge of the full charge or the secondary battery has reached the full charge; and a display that indicates information regarding the estimated time level based on determination regarding the estimated time level made by the controller, wherein when the controller determines that the secondary battery is on the verge of the full charge, the controller controls the display to indicate an estimated time level indicative of a minimum time required for the secondary battery to reach the full charge.

According to still another aspect of the invention, there is provided a battery charger for charging a secondary battery, that includes a battery temperature sensor that detects a temperature of the secondary battery and outputs a temperature signal indicative of the temperature of the secondary battery; a controller that calculates a temperature rise of the secondary battery during charging based on the temperature signal, determines whether the secondary battery is on the verge of a full charge or the secondary battery has reached a full charge based on the temperature rise, and further determines an estimated time level from among a plurality of different estimated time levels that indicate how much time is required for the secondary battery to reach a full charge based on whether the secondary battery is on the verge of the full charge or the secondary battery has reached the full charge; and a display that indicates information regarding the estimated time level based on determination regarding the estimated time level made by the controller, wherein when the controller determines that the secondary battery is on the verge of the full charge, the controller controls the display to indicate an estimated time level indicative of a minimum time required for the secondary battery to reach the full charge.

According to yet another aspect of the invention, there is provided a battery charger for charging a secondary battery, that includes a battery voltage detector that detects a voltage of the secondary battery and outputs a voltage signal indicative of the voltage of the secondary battery; a controller that calculates a voltage gradient within a predetermined time interval based on the voltage signal, determines whether the secondary battery is on the verge of a full charge or the secondary battery has reached a full charge based on the voltage gradient, and further determines an estimated time level from among a plurality of different estimated time levels that indicate how much time is required for the secondary battery to reach a full charge based on whether the secondary battery is on the verge of the full charge or the secondary battery has reached the full charge; and a display that indicates information regarding the estimated time level based on determination regarding the estimated time level made by the controller, wherein when the controller determines that the secondary battery is on the verge of the full charge, the controller controls the display to indicate an estimated time level indicative of a minimum time required for the secondary battery to reach the full charge.

BRIEF DESCRIPTION OF THE DRAWINGS

In the drawings:

FIG. 4 is an explanatory diagram showing flags used in the method for controlling the battery charger;

FIG. 5 is an explanatory diagram showing the charge control according to the battery charger;

DESCRIPTION OF THE PREFERRED EMBODIMENTS

Figure 1:
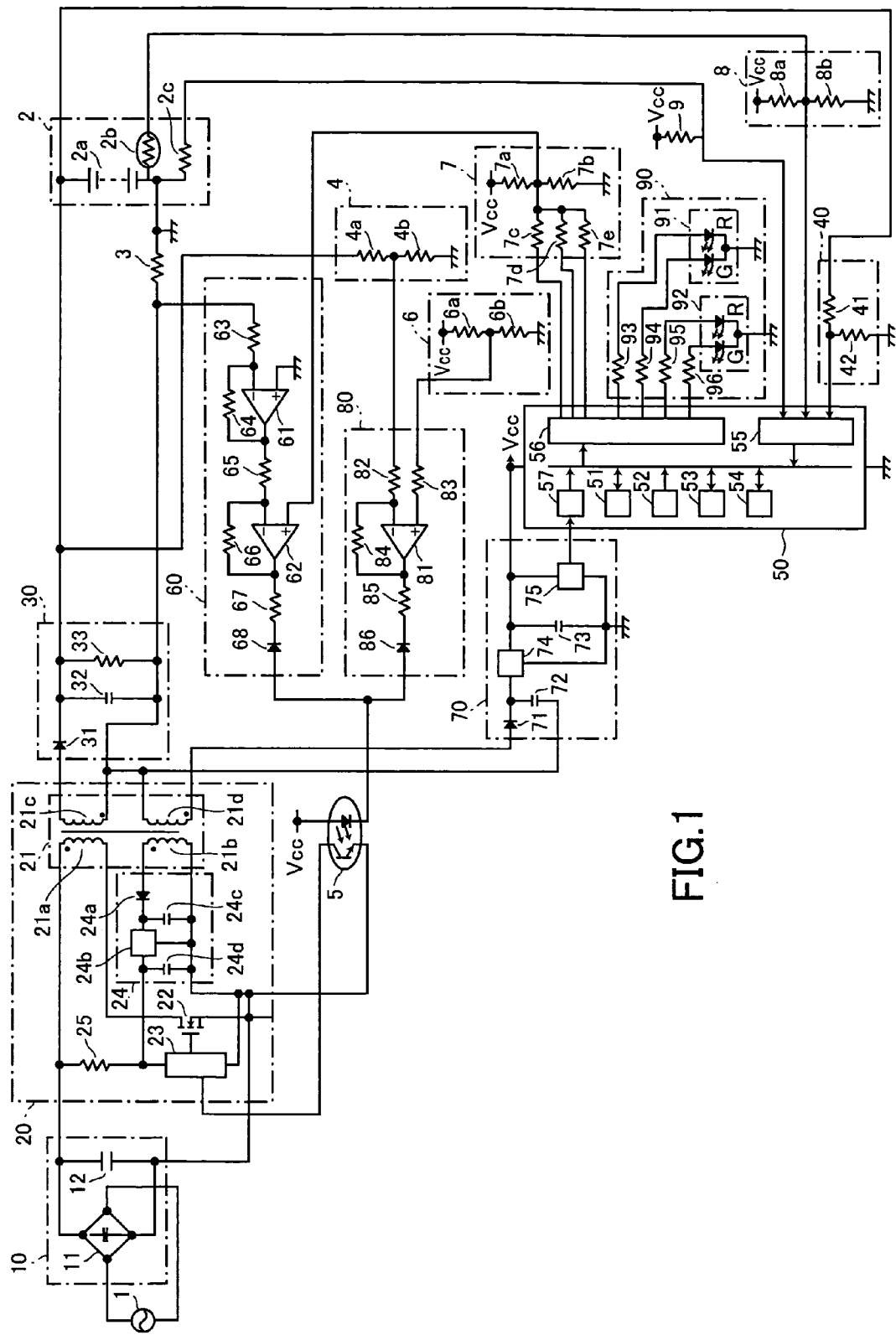
FIG. 1 is a schematic drawing showing a battery charger according to preferred embodiment of the present invention.

FIG. 1 is a schematic diagram showing a battery charger according to a preferred embodiment of the present invention. As shown in FIG. 1, the battery charger includes an AC power source 1 and a battery pack 2. The battery pack 2 houses a battery 2a consisting of a plurality of cells connected in series, a temperature sensor 2b, and a cell number detector 2c. The temperature sensor 2b is configured of a thermistor, for example, disposed in contact with or in the proximity of the cells for detecting the cell temperature. The cell number detector 2c serves to determine the number of cells and is set to a resistance value, for example, corresponding to that number.

The battery charger also includes a current detecting circuit 3 for detecting a charging current flowing in the battery pack 2; and an output voltage detecting circuit 4 including resistors 4a and 4b. The output voltage detecting circuit 4 divides an output voltage from a secondary rectifying/smoothing circuit 30 with the resistors 4a and 4b and outputs the resulting voltage to an output voltage control circuit 80. The battery charger also includes a photo-coupler 5 that feeds back the output voltage from the secondary rectifying/smoothing circuit 30 and charging current signals to a PWM control IC 23; and an output voltage setting circuit 6 including resistors 6a and 6b. The voltage determined by the divided voltage ratio of the resistors 6a and 6b is a reference voltage that the output voltage control circuit 80 compares with output voltages from the secondary rectifying/smoothing circuit 30.

The battery charger also includes a charging, current setting circuit 7 having resistors 7a–7e. The voltage divided by resistors 7a and 7b is applied to an output port 56 of a microcomputer 50 via the resistors 7c, 7d, and 7e. The charging current is set by selecting one of the resistors 7c, 7d, and 7e, that is, by setting the output port to either LOW level or HIGH level.

The battery charger further includes a battery temperature sensor 8 having resistors 8a and 8b. The divided voltage determined by a division ratio of the resistors 8a and 8b to the temperature sensor 2b is inputted into an A/D converter 55 of the microcomputer 50. When the resistance value of the temperature sensor 2b changes due to the temperature of the battery, the division ratio changes, and the divided voltage is inputted into the A/D converter 55, Hence, the temperature of the battery pack 2 can be detected based on changes in the voltage.

The battery charger further includes a resistor 9 used for determining the number of cells in the battery pack 2. Different resistance value is assigned to the cell number detector 2c corresponding to the number of cells in the battery pack 2. A voltage $V_{cc}$ is divided by the resistor 9 and the cell number detector 2c (also a resistor in the present embodiment), and the divided voltage is inputted into the A/D converter 55. Since the voltage changes according to the resistance value of the cell number detector 2c, the number of cells in the battery pack 2 can be determined from the voltage. For example, the number of cells can be determined by dividing the terminal voltage of the battery pack 2 by the voltage per unit cell. Hence, the present invention is not limited to a construction that adds the cell number detector 2c to the battery pack 2.

The battery charger further includes a primary rectifying/smoothing circuit 10 that includes a full-wave rectifier 11 and a smoothing capacitor 12; and a switching circuit 20 that includes a high-frequency transformer 21, a MOSFET 22, an SW controlling IC 23, a constant voltage circuit 24 for an SW controlling IC, and a starting resistor 25. The high-frequency transformer 21 includes a primary coil 21a, a secondary coil 21b, a ternary coil 21c, and a quaternary coil 21d. A DC input voltage is applied to the primary coil 21a. The secondary coil 21b is the output coil for the SW controlling IC. The ternary coil 214 is the output coil for charging the battery pack 2. The quaternary coil 21d is an output coil for a power source supplying power to the microcomputer 50, a charging current controller 60, and the like.

The secondary coil 21b and the quaternary coil 21d are configured with the same polarity as the primary coil 21a, while the ternary coil 21c has reverse polarity. The SW controlling IC 23 is a switching power supply IC that adjusts output voltage by changing the width of driving pulses applied to the MOSFET 22. The constant voltage circuit 24 includes a diode 24a, a 3-terminal regulator 24b, and capacitors 24c and 24d. The constant voltage circuit 24 converts the voltage outputted from the secondary coil 21b into a constant voltage.

The battery charger further includes a secondary rectifying/smoothing circuit 30 that includes a diode 31, a smoothing capacitor 32, and a resistor 33; a battery voltage detecting circuit 40 that includes resistors 41 and 42 for dividing the voltage across the terminals of the battery pack 2. The divided voltage is inputted to the CPU 51 via the A/D converter 55. The microcomputer 50 includes a CPU 51, a ROM 52, a RAM 53, a timer 54, an A/D converter 55, an output port 56, and a reset input port 57.

The CPU 51 samples a signal inputted into the A/D converter 55 at prescribed intervals and compares the current battery temperature with temperatures from several previous samplings. Based on these comparisons, the CPU 51 determines whether the charging status of the battery pack 2 is on the verge of a full charge or whether the battery pack 2 has reached a full charge. The RAM 53 stores only a predetermined number of samplings for battery voltage and temperature.

The battery charger further includes a charging current controller 60 that includes operational amplifiers 61 and 62, resistors 63–67, and a diode 68. The charging current detected by the current detecting circuit 3 is applied to the operational amplifier 61 by which the voltage corresponding this charging current is amplified and inverted. The operational amplifier 62 amplifies the difference between the output voltage of the operational amplifier 61 and the charging current setting reference voltage set by the charging current setting circuit 7 and feeds this difference back to the SW controlling IC 23 via the photo-coupler 5.

The SW controlling IC 23 switches the MOSFET 22 on and off in order to maintain the charging current at a constant current. Specifically, the pulse generated and applied to the high-frequency transformer 21 is varied between a narrow pulse width when the charging current is large and a wide pulse width when the charging current is small. This pulse is smoothed to a direct current by the secondary rectifying/smoothing circuit 30 before being applied to the battery pack 2. Hence, the current detecting circuit 3, charging current controller 60, photo-coupler 5, switching circuit 20, and secondary rectifying/smoothing circuit 30 function to maintain the charging current of the battery pack 2 at the current value set by the microcomputer 50.

The battery charger further includes a constant voltage circuit 70 having a diode 71, capacitors 72 and 73, a 3-terminal regulator 74, and a reset IC 75. The constant voltage circuit 70 outputs a voltage for powering the microcomputer 50, the charging current controller 60, and the like. The reset IC 75 outputs a reset signal to the reset input port 57 in order to reset the microcomputer 50 to an initialized state.

The battery charger also includes an output voltage control circuit 80 having an operational amplifier 81, resistors 82–85, and a diode 86. The operational amplifier 81 amplifies the difference between the voltage from the output voltage detecting circuit 4 and the voltage from the output voltage setting circuit 6 and feeds this difference back to the SW controlling IC 23 via the photo-coupler 5, whereby the output voltage of the secondary rectifying/smoothing circuit 30 is controlled.

The battery charger further includes a display circuit 90 having LEDs 91 and 92 and resistors 93–96. The LEDs 91 and 92 are configured of a red light-emitting diode R and a green light-emitting diode G, for example. The LED's may be of a type that can illuminate red, green, or both colors simultaneously to produce an orange color based on output from the output port 56 of the microcomputer 50. In the preferred embodiment, the LED 91 illuminates red prior to starting a charging process and green upon completion of the charging process. The LED 92 changes its display in three stages during the charging process to indicate how much time is required to complete the charge. In order from longest to shortest amount of remaining charge time, the colors illuminated are red, orange, and green. The significance of colors illuminated by the LED 91 and LED 92 are summarized in the tables below.

TABLE 1

| LED 91 display | |
| --- | --- |
| Prior to charging | Red |
| After completing charge | Green |

TABLE 2

| LED 92 display Time required for completing the charge | |
| --- | --- |
| Long | Red |
| Medium | Orange |
| Short | Green |

Figure 2:
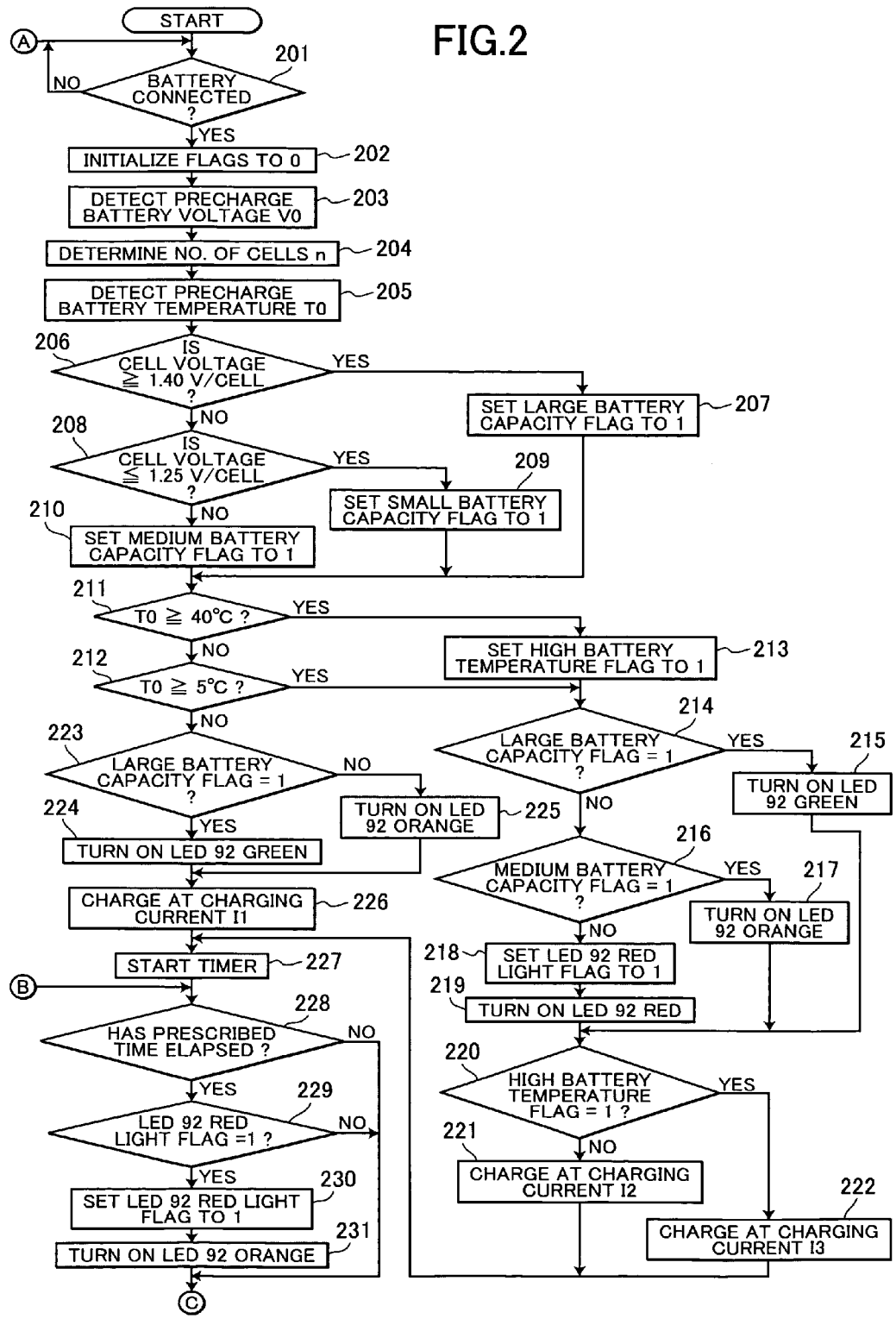
FIG. 2 is a flowchart showing steps in a method for controlling the battery charger of the preferred embodiment.
Figure 3:
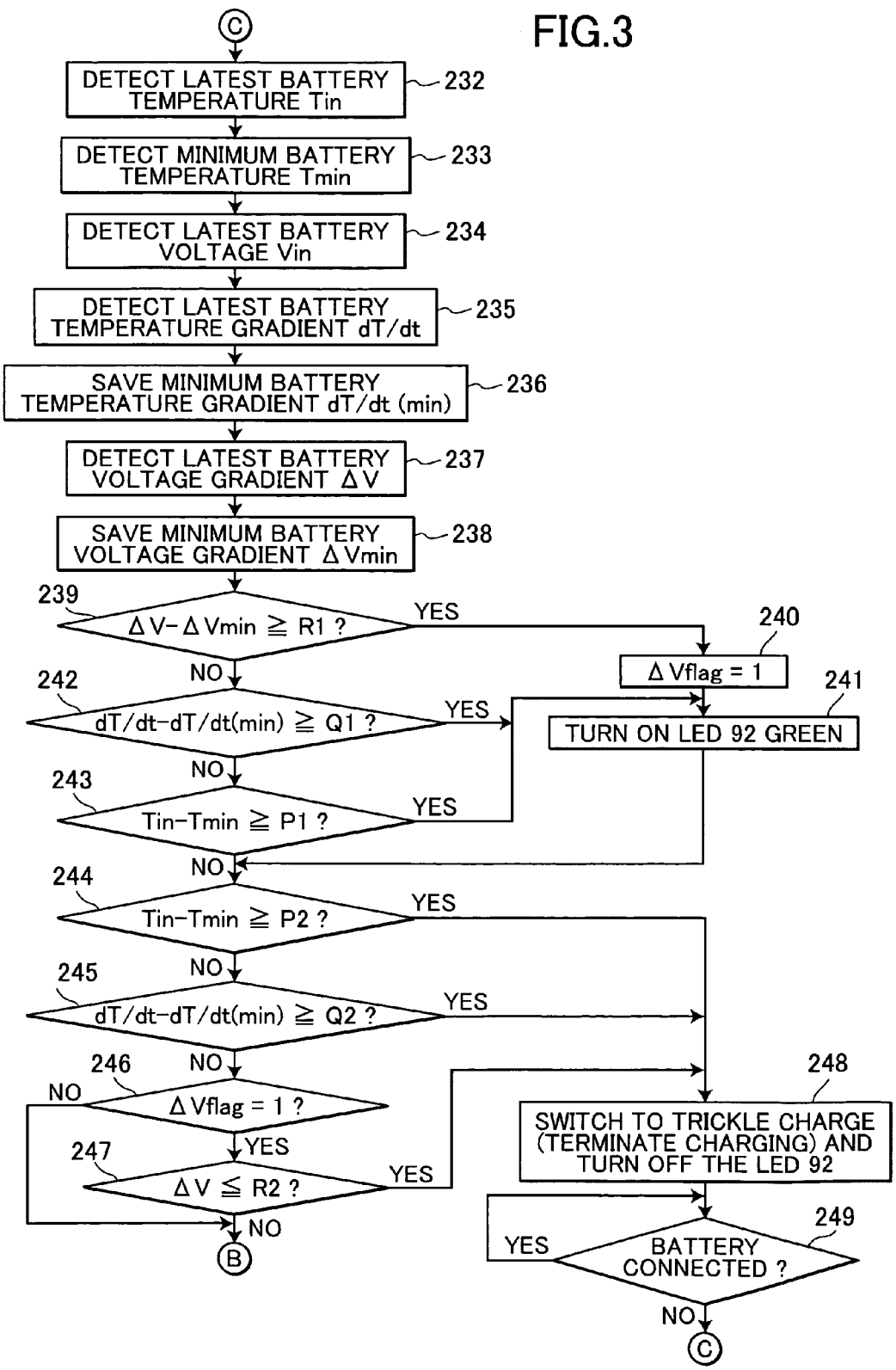
FIG. 3 is a flowchart showing steps in a method for controlling the battery charger of the preferred embodiment.

Next, a method for controlling the battery, charger will be described with reference to the schematic diagram in FIG. 1 and the flowcharts in FIGS. 2 and 3. When power to the battery charger is turned on, the microcomputer 50 enters a wait state, waiting for the connection of the battery pack 2. In S201 the microcomputer 50 determines whether the battery pack 2 is connected based on signals from the battery voltage detecting circuit 40, the battery temperature sensor 8, and the cell number detecting resistors consisting of the resistor 9 and the cell number detector 2c.

When the battery pack 2 is connected, the microcomputer 50 resets all flags stored in the RAM 53 to initial values in S202. The flags are used to display the battery status. As shown in FIG. 4, these flags include a large remaining battery capacity flag, a medium remaining battery capacity flag, a small remaining battery capacity flag, a high battery temperature flag, an LED 92 red light flag for displaying the discharge status of the battery, and a $\Delta V$ flag for indicating a full charge based on the detected battery voltage.

In S203 the battery voltage detecting circuit 40 detects the battery voltage V0 prior to beginning the charging process and inputs this value into the microcomputer 50 via the A/D converter 55. In S204 the microcomputer 50 determines a number of cells n of the battery pack 2 based on the output voltage at a connection between the resistor 9 and the cell number detector 2c inputted to the microcomputer 50 via the A/D converter 55. Here, the cell number detector 2c built into the battery pack 2 is set to a resistance value corresponding to the number of cells. Since the divided voltage of the cell number detector 2c and the resistor 9 differs according to the number of cells, the number of cells in the battery pack 2 can be determined based on this divided voltage.

In S205 the battery temperature sensor 8 detects a temperature T0 prior to beginning the charging process and inputs this value into the microcomputer 50. The output voltage from the battery temperature sensor 8 is determined based on the resistance value of the temperature sensor 2b. Since the resistance value of the temperature sensor 2b varies when the battery temperature changes, the battery temperature can be determined from the voltage outputted from the battery temperature sensor 8.

Next, the microcomputer 50 calculates the cell voltage in the battery pack 2 based on the precharge battery voltage V0 and the number of cells n. The cell voltage is found by dividing the precharge battery voltage V0 by the number of cells n. In S206 the microcomputer 50 determines whether the cell voltage is greater than or equal to 1.40 V/cell. If the cell voltage is greater than or equal to 1.40 V/cell, indicating that the remaining battery capacity of the battery pack 2 being charged is large, then in S207 the microcomputer 50 sets the large remaining battery capacity flag in the RAM 53 to 1 and jumps to S211.

However, if the microcomputer 50 determines that the cell voltage is less than 1.40 V/cell in S206, then in S208 the microcomputer 50 determines whether the cell voltage is less than or equal to 1.25 V/cell. If the cell voltage is less than or equal to 1.25 V/cell, indicating that the remaining battery capacity in the battery pack 2 to be charged is low, then in 3209 the microcomputer 50 sets the small remaining battery capacity flag in the RAM 53 to 1. However, if the microcomputer 50 determines in S208 that the cell voltage is greater than 1.25 V/cell, indicating that the battery pack 2 has a medium remaining battery capacity, then in S210 the microcomputer 50 sets the medium remaining battery capacity flag in the RAM 53 to 1.

In 5211 the microcomputer 50 determines whether the precharge temperature T0 of the battery pack 2 is greater than or equal to 40° C. If the precharge temperature T0 is greater than or equal to 40° C., then in S213 the microcomputer 50 sets the high battery temperature flag to 1 and in S214 determines whether the large remaining, battery capacity flag in the RAM 53 is set to 1. If the large remaining battery capacity flag is set to 1, indicating that the remaining charge in the battery pack 2 is high, then the microcomputer 50 determines that the time required to complete the charge will be short and in S215 the microcomputer 50 turns on the green light of the LED 92. Subsequently, the microcomputer 50 jumps to S220.

However, if the large remaining battery capacity flag is 0 in S214, then in 5216 the microcomputer 50 determines whether the medium remaining battery capacity flag is set to 1. If the medium remaining battery capacity flag is 1, indicating that the battery pack 2 to be charged has a medium charge remaining, then the microcomputer 50 determines that a medium amount of time will be required to complete the charge. Accordingly, in S217 the microcomputer 50 turns on the orange light in the LED 92, and subsequently jumps to S220.

When the medium remaining battery capacity flag is not 1 in S216, then the microcomputer 50 determines that the battery pack 2 has a small remaining charge. Accordingly, in S218 the microcomputer 50 sets the LED 92 red light flag to 1, and in S219 turns on the red light of the LED 92. In S220 the microcomputer 50 determines whether the high battery temperature flag in the RAM 53 is set to 1. If the high battery temperature flag is 1, then the microcomputer 50 determines that the battery pack 2 has reached a high temperature. Accordingly, in S222 the microcomputer 50 begins charging the battery pack 2 with a charging current I3 suited for the high-temperature state of the battery pack 2, and subsequently jumps to the process of S227. In the preferred embodiment, charging currents are set in the three levels I1, I2, and I3, such that I1>I2>I3.

However, if the high battery temperature flag is not 1 in S220, indicating that the battery pack 2 was determined to be at a low temperature in the process of S212 described below. Accordingly, in S221 the microcomputer 50 begins charging the battery pack 2 at the charging current I2 suitable for the low temperature state of the battery pack 2, and subsequently jumps to the process of S227.

To set the charging current to I3, the microcomputer 50 can set the output port led to the resistor 7c of the charging current setting circuit 7 to LOW level, with the remaining output ports led to the resistor 7d and resistor 7e at HIGH level. The charging current setting reference voltage V3 outputted from the charging current setting circuit 7 is applied to the operational amplifier 62 and compared to the charging current flowing in the battery pack 2. The difference between the actual charging current and the set charging current is fed back to the SW controlling IC 23 via the photo-coupler 5, enabling the charging current to be controlled at I3 by controlling the pulse width applied to the MOSFET 22.

The charging current I2 is controlled in a similar manner. The microcomputer 50 sets a charging current setting reference voltage V2 corresponding to the charging current I2 by setting the output port led to the resistor 7d of the charging current setting circuit 7 to LOW level, while the remaining output ports led to the resistors 7c and 7e are set at HIGH level.

If the precharge temperature T0 is less than 40° C. in S211, then in S212 the microcomputer 50 determines whether the precharge temperature T0 is less than or equal to 5° C. If the precharge temperature T0 is less than or equal to 5° C., then the process described above in steps S214–S222 are performed.

However, if the precharge temperature T0 is greater than 5° C. in S212, then based on the processes of S211 and S212 described above the microcomputer 50 determines that the battery pack 2 is neither at a high temperature nor a low temperature, i.e., is at a temperature conducive to rapid charging. In other words, the battery pack 2 is charged at the smallest charging current I3 (I3<I2<I1) when the battery temperature is 40° C. or greater, at the charging current I2 when the battery temperature is 5° C. or less, and at the largest charging current I1 when the precharge temperature T0 is such that 40° C.>T0>5° C., at which rapid charging can be performed. After S212, the microcomputer 50 determines in S223 whether the large battery capacity flag is set to 1. If the large battery capacity flag is set to 1, then the microcomputer 50 determines that charging will be completed in a short amount of time. Accordingly, the microcomputer 50 illuminates the green light of the LED 92 in S224.

However, if the large battery capacity flag is not 1 in S223, the remaining charge in the battery pack 2 is a small to medium amount, but the battery is at a temperature at which rapid charging can be performed with a large charging current. Therefore, the microcomputer 50 determines that a medium amount of time will be required to complete the charge and illuminates the orange color of the LED 92 in S225. In S226 the microcomputer 50 begins charging the battery pack 2 with the charging current I1 (I1>I2, I3).

The charging current I1 is obtained by setting the output ports led to the resistors 7c, 7d, and 7e to HIGH level in order to produce a charging current setting reference voltage V1 corresponding to the charging current I1.

After beginning the charging process, the microcomputer 50 begins time measurement of the process with the timer 54 in S227. In S228 the microcomputer 50 determines whether a prescribed time has elapsed since the beginning of the charging process. When the prescribed time has elapsed, the microcomputer 50 determines in S229 whether the LED 92 red light flag is set to 1. When the LED 92 red light flag is 1, then sufficient time has elapsed since the microcomputer 50 determined that a large amount of time would be required to complete the charging process. Therefore, the microcomputer 50 determines that the time required to complete the charge is now a medium amount of time and resets the LED 92 red light flag to 0 in S230. In S231 the microcomputer 50 illuminates the orange color of the LED 92.

However, if in S228 the prescribed time has not elapsed since the beginning of the charging process, then the microcomputer 50 jumps to S232. Similarly, if the LED 92 red light flag is not 1 in S229, then the microcomputer 50 jumps to S232.

As described above, the remaining battery capacity is determined from cell voltages prior to beginning the charge, and the charging current is set based on the temperature of the battery pack prior to beginning the charging operation or in the initial stage of charging. Next, the time required to complete the charge is estimated from the remaining capacity of the battery and the size of the charging current. This remaining time is divided into three levels, and a color corresponding to the current level is displayed, enabling the user to learn at the beginning of a charging process about how much time will be needed to complete the process.

Next, the steps in a process for determining if the battery pack 2 is nearing a full charge and if the battery pack 2 has achieved a full charge will be described with reference to FIG. 3. In S232 the battery temperature sensor 8 inputs the latest battery temperature $T_{in}$ into the microcomputer 50. Output signals from the battery temperature sensor 8 are sampled at prescribed intervals and stored in the RAM 53. In S233 the microcomputer 50 calculates and saves a minimum battery temperature $T_{min}$ during the charging process by comparing battery temperature data sampled during the charging process.

In S234 the battery voltage detecting circuit 40 detects the latest battery voltage $V_{in}$ of the battery pack 2. In S235 the microcomputer 50 calculates the latest battery temperature gradient dT/dt within a prescribed number of samplings from battery temperature data sampled during the charging process based on output from the battery temperature sensor 8. In S236 the microcomputer 50 saves the minimum dT/dt (min) of the battery temperature gradient dT/dt within the prescribed number of samplings by comparing the latest battery temperature gradient dT/dt with the data already saved as the minimum dT/dt.

Further, in S237 the microcomputer 50 calculates the latest battery voltage gradient ΔV over a prescribed number of samplings from battery voltage data calculated during the charging process based on output from the battery voltage detecting circuit 40. In S238 the microcomputer 50 calculates and saves the minimum $\Delta V_{min}$ of the battery voltage gradient over the prescribed number of samplings by comparing data in the battery voltage gradient ΔV.

Next, the process for determining whether the battery pack 2 is on the verge of a full charge will be described. Based on data from the processes of S232–S238, the latest battery voltage gradient ΔV is compared to the minimum $\Delta V_{min}$ of the battery voltage gradient calculated from samples taken during the charging process. In S239 the microcomputer 50 determines whether the latest battery voltage gradient ΔV has risen a predetermined value R1 or greater over the minimum $\Delta V_{min}$ of the battery voltage gradient measured during the charging process.

If the microcomputer 50 determines that the battery voltage gradient ΔV has risen the predetermined value R1 or greater over the minimum $\Delta V_{min}$ in S239, then the microcomputer 50 determines that the battery pack 2 is on the verge of a full charge. Accordingly, in S240 the microcomputer 50 sets the ΔV flag in the RAM 53 to 1. In this case, the microcomputer 50 determines that the time required to complete the charge has become small. Therefore, the microcomputer 50 illuminates the green light of the LED 92 in S241 and subsequently jumps to the process of S244.

However, if the microcomputer 50 determines in S239 that the latest battery voltage gradient ΔV has not risen the predetermined value R1 or greater over the minimum $\Delta V_{min}$ of the battery voltage gradient measured during the charging process, then the microcomputer 50 compares the latest battery temperature gradient dT/dt to the minimum $dT/dt_{min}$ of the battery temperature gradient calculated from samplings taken during the charging process. In S242 the microcomputer 50 determines whether the latest battery temperature gradient dT/dt has risen a predetermined value Q1 or greater over the minimum $dT/dt_{min}$ of the battery temperature gradient measured during the charging process. If the microcomputer 50 determines that the latest battery temperature gradient dT/dt has risen the predetermined value Q1 or greater (i.e., the A/D converted value of the battery temperature gradient has reached or exceeded the level "B" shown in FIG. 5) over the minimum value, then the microcomputer 50 determines that the battery pack 2 is on the verge of a full charge. Accordingly, in S241 the microcomputer 50 illuminates the green light of the LED 92 and subsequently, jumps to the process of S244.

Figure 6:
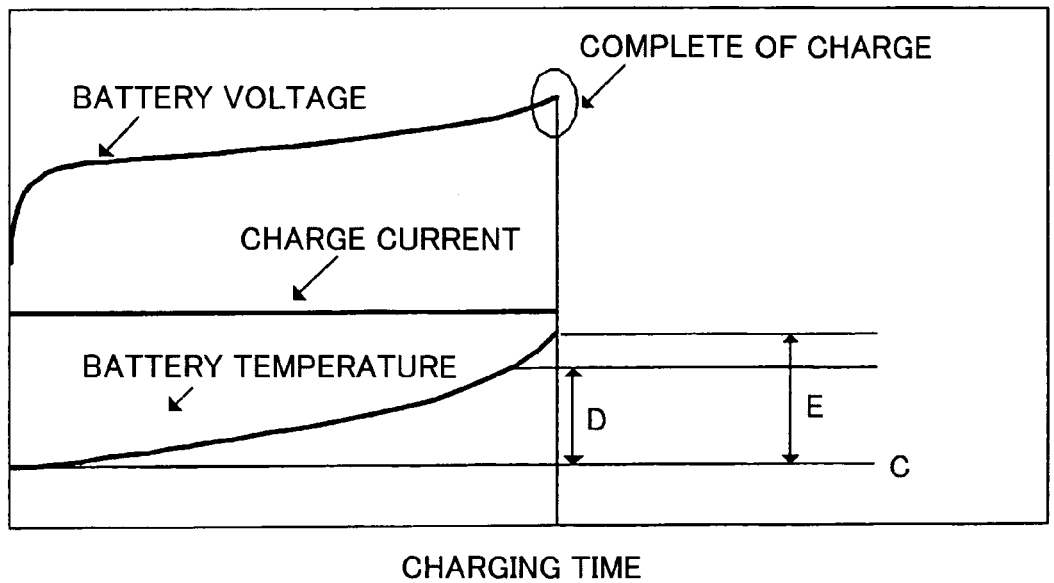
FIG. 6 is an explanatory diagram showing the charge control according to the battery charger.

If the microcomputer 50 determines that the latest battery temperature gradient dT/dt has not risen the predetermined value Q1 or greater over the minimum value in S242, then the microcomputer 50 compares the latest, battery temperature $T_{in}$ with a minimum $T_{min}$ of battery temperatures measured during the charging process and determines whether the latest battery temperature $T_{min}$ has risen a predetermined value P1 or greater (i.e., the latest battery temperature $T_{in}$ has reached or exceeded the level "D" shown in FIG. 6) over a minimum $T_{in}$ of battery temperatures measured during the charging process in S243. If the latest battery temperature $T_{in}$ has risen the predetermined value P1 or greater over the minimum battery temperature $T_{min}$, as shown in FIG. 6, then the microcomputer 50 determines that the battery pack 2 is on the verge of a full charge. Accordingly, in S241 the microcomputer 50 illuminates the green light of the LED 92 and subsequently, jumps to the process of S244.

Next, the process for determining whether the battery pack 2 has reached a full charge will be described. In S244 the microcomputer 50 determines whether the latest battery temperature $T_{in}$ has risen a predetermined value P2 (P2>P1) or greater over a minimum $T_{min}$ of battery temperatures measured during the charging process. If the battery temperature $T_{in}$ has risen the predetermined value P2 or greater (i.e., the latest battery temperature has reached or exceeded the level "E" shown in FIG. 6) over the minimum battery temperature $T_{min}$, then the microcomputer 50 determines that the battery pack 2 has been fully charged. At this time, the microcomputer 50 stops the charging process and sets the charging current to a value for performing a trickle charge. The current for a trickle charge is set by setting the output ports led to the resistors 7c, 7d, and 7e to the LOW level. In S248 a current setting reference voltage corresponding to the trickle charging current is applied to the operational amplifier 62 to perform a trickle charge, and the microcomputer 50 turns off the LED 92. In S249 the microcomputer 50 determines whether the battery pack 2 has been removed from the battery charger. If the battery pack has been removed, the microcomputer 50 returns to S201 and waits to perform the next charging process.

If the microcomputer 50 determines in S245 that the latest battery temperature gradient dT/dt has not risen the predetermined value Q2 or greater over the minimum $dT/dt_{min}$ of the battery temperature gradient measured during the charging process (i.e., the A/D converted value of the battery temperature gradient has not reached the level "A" shown in FIG. 5), then the microcomputer 50 determines in S246 whether the ΔV flag in the RAM 53 is set to 1. If the ΔV flag is not set to 1, then the microcomputer 50 determines that the battery pack 2 has not reached a full charge, and returns to S228.

Figure 7:
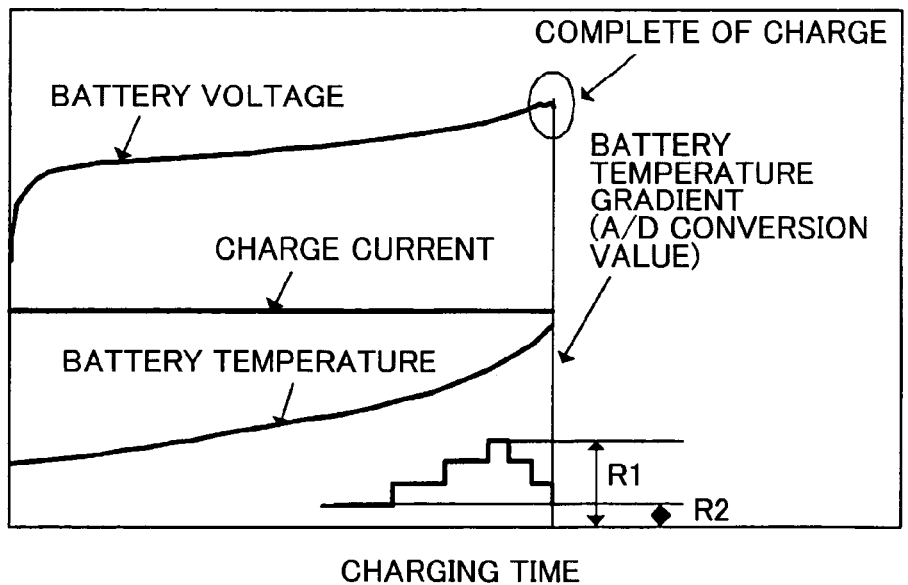
FIG. 7 is an explanatory diagram showing the charge control according to the battery charger.

However, if the ΔV flag is set to 1 in S246, then in S247 the microcomputer 50 determines whether the latest battery voltage gradient ΔV is less than or equal to the predetermined value R2 (FIG. 7). If the latest battery voltage gradient ΔV is less than or equal to the predetermined value R2, then the microcomputer 50 determines that the battery pack 2 has achieved a full charge and performs the processes in steps S248 and S249 described above. However, if the latest battery voltage gradient ΔV is greater than the predetermined value R2, then the microcomputer 50 returns to the process in S228.

As described above, after beginning the charging process according to the preferred embodiment, the microcomputer 50 determines whether the battery pack 2 is on the verge of a full charge based on calculation signals for the battery voltage $V_{min}$ and the battery temperature $T_{in}$ and changes the LED display when the battery pack 2 is determined to be on the verge of a full charge. In this way, the user can learn after the charging process has begun whether the battery pack 2 is on the verge of a full charge or whether the battery pack 2 has reached a full charge.

In the preferred embodiment described above, the battery charger determines whether the battery pack 2 is on the verge or has reached a full charge by comparing the minimum battery temperature $T_{min}$, the minimum battery temperature gradient $dT/dt_{min}$, and the minimum battery voltage gradient $\Delta V_{min}$, but the present invention is not limited to this method. For example, the battery charger can perform these determinations by comparing the latest data to predetermined values.

Further, while the operations of the LED 91 were not described in the preferred embodiment, the LED 91 may be used to illuminate a red color when waiting to begin a charging process and a green color when the charging process has completed (after switching to a trickle charge).

While the battery charger of the preferred embodiment is controlled to supply a trickle charge (minimal current) after the battery has reached a full charge, the power to the control system may be supplied from a separate power source, so that the main power source can be shut down after completing a charging process to completely halt the charging current.

Figure 8:
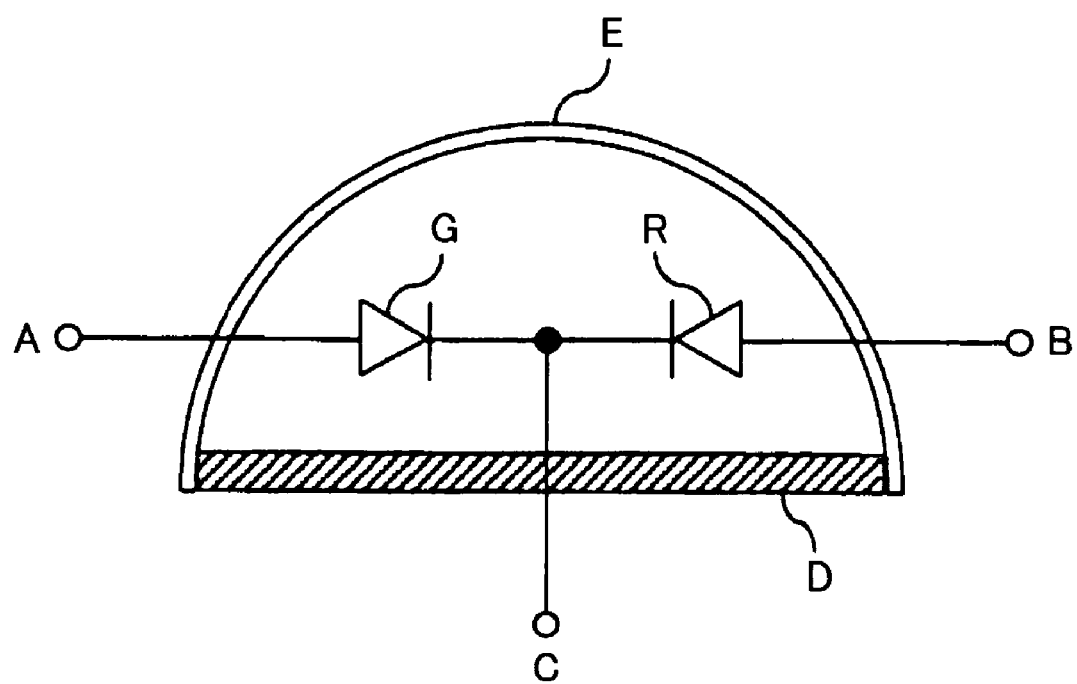
FIG. 8 is an explanatory diagram showing an LED used in the battery charger.

FIG. 8 shows a sample LED used in the battery charger of the present invention. The overall construction of this LED is known in the art. As shown in the drawing, the LED includes a substrate D, an element G for emitting a green light from the top surface of the LED, and an element R for emitting a red light from the top surface. The two elements G and R are hermetically sealed in a vessel E formed of glass, plastic, or the like, with terminals A, B, and C extending out of the vessel E.

When a current flows between terminals A and C, the LED emits a green light, When a current flows between terminals B and C, the LED emits a red light. Further, when currents flow simultaneously between terminals A add C and terminals B and C, the elements G and R simultaneously emit green light and red light, respectively. The combined effect of this emitted light appears orange when viewed from outside the vessel E.

In the preferred embodiment of the present invention described above, the time remaining to achieve a full charge is divided into three levels and the color of light emitted from the LED is changed according to the level. However, the present invention is not limited to this number of levels.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A battery charger for charging a secondary battery, comprising:
    a battery voltage detector that detects a voltage of the secondary battery and outputs a voltage signal indicative of the voltage of the secondary battery;
    a battery temperature sensor that detects a temperature of the secondary battery and outputs a temperature signal indicative of the temperature of the secondary battery;
    a controller that determines an estimated time level from among a plurality of different estimated time levels that indicate how much time is required for the secondary battery to reach a full charge based on the temperature signal and the voltage signal both output when the secondary battery is at a precharge state; and
    a display that indicates information regarding the estimated time level based on determination made by the controller.

2. The battery charger according to claim 1, further comprising:
    charging current setter that sets a target charging current to be supplied to the secondary battery and outputs a target current signal indicative of the target charging current set by the charging current setter; and
    a charging current controller that controls a charging current flowing in the secondary battery to be in coincidence with the target charging current based on the target current signal,
    wherein the controller determines a magnitude of the target charging current to be supplied to the secondary battery based on the temperature signal, and outputs a current signal indicative of the magnitude of the target charging current determined by the controller to the charging current setter.

3. The battery charger according to claim 1, wherein the controller changes the magnitude of the target charging current to another magnitude lower by one step than the magnitude determined by the controller after expiration of a predetermined period of time starting from beginning of charging.

4. The battery charger according to claim 1, wherein the secondary battery comprises a plurality of cells connected in series and forms a battery pack.

5. The battery charger according to claim 1, wherein the display comprises an LED, the LED including a vessel, a first light emitting diode, and a second light emitting diode, the first light emitting diode and the second light emitting diode emitting lights of a first color and a second color respectively and being sealed in the vessel, wherein when the estimated time level is a first level, the first light emitting diode is powered to emit the light of the first color; when the estimated time level is a second level, the second light emitting diode is powered to emit the light of the second color; and when the estimated time level is a third level, the first light emitting diode and the second light emitting diode are both powered simultaneously to emit a light of a third color.

6. The battery charger according to claim 5, wherein the controller calculates a battery temperature gradient based on the temperature signal, and wherein when a difference between latest battery temperature gradient and a minimum value of the battery temperature gradient has become a value greater than a first predetermined value, the controller changes the estimated time level to another estimated time level and also changes the color of light emitted from the LED.

7. The battery charger according to claim 5, wherein the controller selects a minimum value of the battery temperature based on the temperature signal, and wherein when a difference between latest battery temperature and the minimum value of the battery temperature has become a value greater than a second predetermined value, the controller changes the estimated time level to another estimated time level and also changes the color of light emitted from the LED.

8. The battery charger according to claim 5, wherein the controller calculates a minimum value of a battery voltage gradient based on the voltage signal, and wherein when a difference between latest battery voltage gradient and the minimum value of the battery voltage gradient has become a value greater than a third predetermined value, the controller changes the estimated time level to another estimated time level and also changes the color of light emitted from the LED.

9. The battery charger according to claim 5, wherein the secondary battery comprises a plurality of cells connected in series, and the controller calculates a voltage per one cell making up the secondary battery based on the voltage signal detected at the precharge state and determines the estimated time level based on the voltage per one cell.

10. The battery charger according to claim 5, wherein the controller determines whether the battery temperature is within a predetermined range based on the temperature signal detected at the precharge state and controls the charge current setter so that a first charging current is supplied to the secondary battery when the battery temperature is within the predetermined range and a second charging current is supplied to the secondary battery when the battery temperature is out of the predetermined range, the first charging current being larger in current level than the second current.

11. The battery charger according to claim 10, wherein the controller determines whether a predetermined period of time has expired after setting the charging current and changes the estimated time level to another estimated time level and also changes the color of light emitted from the LED.

12. A battery charger for charging a secondary battery, comprising:
a battery temperature sensor that detects a temperature of the secondary battery and outputs a temperature signal indicative of the temperature of the secondary battery;
a controller that calculates a temperature gradient within a predetermined time interval based on the temperature signal, determines whether the secondary battery is on the verge of a full charge or the secondary battery has reached a full charge based on the temperature gradient, and further determines an estimated time level from among a plurality of different estimated time levels that indicate how much time is required for the secondary battery to reach a full charge based on whether the secondary battery is on the verge of the full charge or the secondary battery has reached the full charge; and
a display that indicates information regarding the estimated time level based on determination regarding the estimated time level made by the controller,
wherein when the controller determines that the secondary battery is on the verge of the full charge, the controller controls the display to indicate an estimated time level indicative of a minimum time required for the secondary battery to reach the full charge.

13. A battery charger for charging a secondary battery, comprising:
a battery temperature sensor that detects a temperature of the secondary battery and outputs a temperature signal indicative of the temperature of the secondary battery;
a controller that calculates a temperature rise of the secondary battery during charging based on the temperature signal, determines whether the secondary battery is on the verge of a full charge or the secondary battery has reached a full charge based on the temperature rise, and further determines an estimated time level from among a plurality of different estimated time levels that indicate how much time is required for the secondary battery to reach a full charge based on whether the secondary battery is on the verge of the full charge or the secondary battery has reached the full charge; and
a display that indicates information regarding the estimated time level based on determination regarding the estimated time level made by the controller,
wherein when the controller determines that the secondary battery is on the verge of the full charge, the controller controls the display to indicate an estimated time level indicative of a minimum time required for the secondary battery to reach the full charge.

14. A battery charger for charging a secondary battery, comprising:
a battery voltage detector that detects a voltage of the secondary battery and outputs a voltage signal indicative of the voltage of the secondary battery;
a controller that calculates a voltage gradient within a predetermined time interval based on the voltage signal, determines whether the secondary battery is on the verge of a full charge or the secondary battery has reached a full charge based on the voltage gradient, and further determines an estimated time level from among a plurality of different estimated time levels that indicate how much time is required for the secondary battery to reach a full charge based on whether the secondary battery is on the verge of the full charge or the secondary battery has reached the full charge; and
a display that indicates information regarding the estimated time level based on determination regarding the estimated time level made by the controller,
wherein when the controller determines that the secondary battery is on the verge of the full charge, the controller controls the display to indicate an estimated time level indicative of a minimum time required for the secondary battery to reach the full charge.

* * * * *